April 2, 1957   R. H. ZINKIL ET AL   2,787,004
STIFFENER MEANS FOR VALVE CLOSURE
Filed Oct. 26, 1955   2 Sheets-Sheet 1

Inventors.
Roy H. Zinkil, &
Carl R. Stone.
By Joseph O. Lange
Atty.

April 2, 1957  R. H. ZINKIL ET AL  2,787,004
STIFFENER MEANS FOR VALVE CLOSURE
Filed Oct. 26, 1955  2 Sheets-Sheet 2
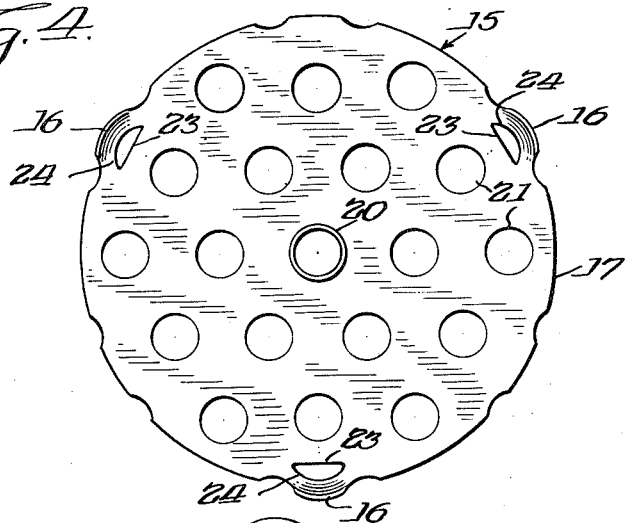
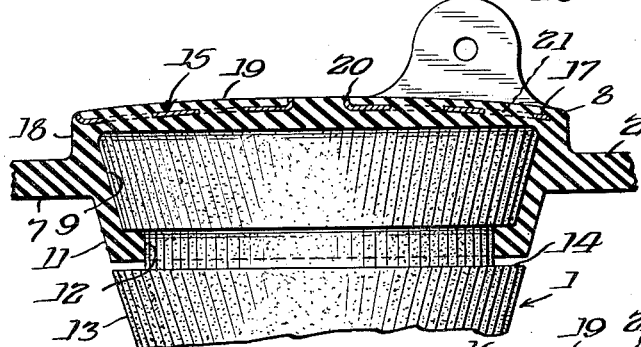
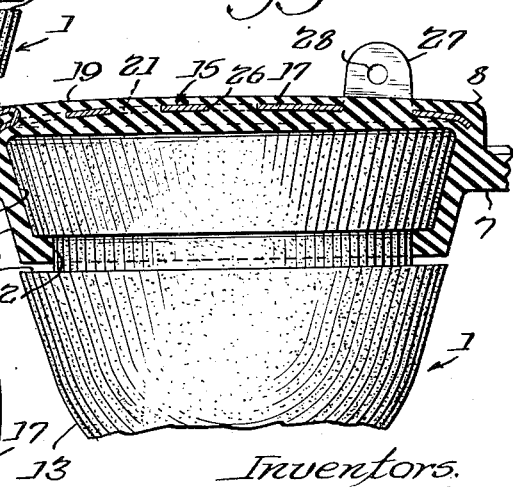
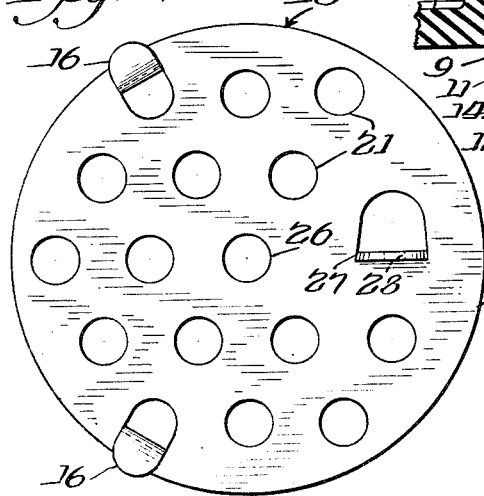
Inventors.
Roy H. Zinkil, &
Carl R. Stone.
By Joseph O. Lange
Atty.

United States Patent Office 2,787,004
Patented Apr. 2, 1957

2,787,004

STIFFENER MEANS FOR VALVE CLOSURE

Roy H. Zinkil, Oak Park, and Carl R. Stone, Lombard, Ill., assignors to Crane Co., Chicago, Ill., a corporation of Illinois Application October 26, 1955, Serial No. 542,942

9 Claims. (Cl. 4—56)

This invention pertains generally to valves and more particularly it is concerned with outlet valves for water closet flush tanks or the like.

The present invention constitutes an improvement over application Serial No. 431,435, filed May 21, 1954, which issued as Patent No. 2,756,437, dated July 31, 1956. It was found in connection with the construction disclosed in that application that the flexible closure portion of rubber or similar material was subject to deflection or pressing in of the top at the center under the action of water pressure or weight of the tank water exerted thereon when the closure was in closed position which, in combination with the flexing of the closure portion during the opening movement when the chain was pulled and resulting spreading or opening of the bottom of the skirt portion, tended to cause the float element to be ejected from the cavity of the closure portion. It was suggested in that application that in order to prevent such flexure of the central part of the closure member that the same could be stiffened by the use of non-flexible hard rubber in this region or by the use of reinforcement means as for instance a metal disc or the like extending across the top of the cavity in which the float element is contained or otherwise embedded within the central portion.

It has since been found that the use of a hard rubber cap along with a flexible seat contacting portion and other parts of the valve member is difficult to mold with a flat seat portion and otherwise expensive and impractical from a commercial standpoint. Likewise, difficulty was experienced with the use of metal or other stiffener means. Attempts to mold metal disc previously suggested proved to be unsuccessful because of the tendency of the disc to float in the rubber or other material during molding and to assume a final random position which was unsatisfactory from a commercial standpoint.

It is accordingly the principal objective of the present invention to provide practical and inexpensive means for preventing flexure of the cap or central portion of the closure member which would cause ejection of the float from the socket portion of the flapper valve.

It is more particularly an object to provide a form of stiffener member which can be accurately positioned in the rubber cap during the molding process.

It is a further object to provide an insert member which is predeterminately assured of a central position within the closure member, being firmly fastened therewithin without any danger of separation or of deterioration of the valve construction.

It is still a further object to provide for substantially complete coverage of the reinforcement member by the rubber or other material during the molding process.

Other objects and advantages will become more readily apparent upon proceeding with the following description read in the light of the accompanying drawing in which:

Fig. 4 is a top plan view of another form of insert member.

Fig. 5 is a fragmentary sectional view of the closure member employing the insert of Fig. 4.

Fig. 6 is a top plan view of still another form of insert member.

Fig. 7 is a fragmentary sectional view of the closure member employing the insert of Fig. 6.

Similar reference numerals refer to similar parts throughout the drawing figures.

Figure 1:
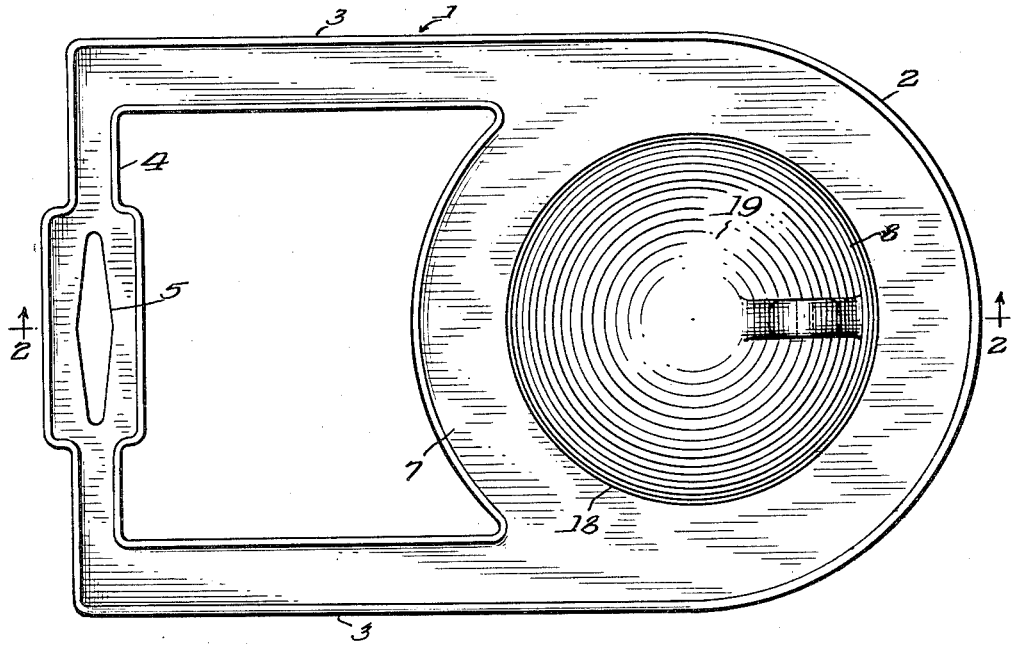
Fig. 1 is a top plan view of a flapper valve employing the present invention.
Figure 2:
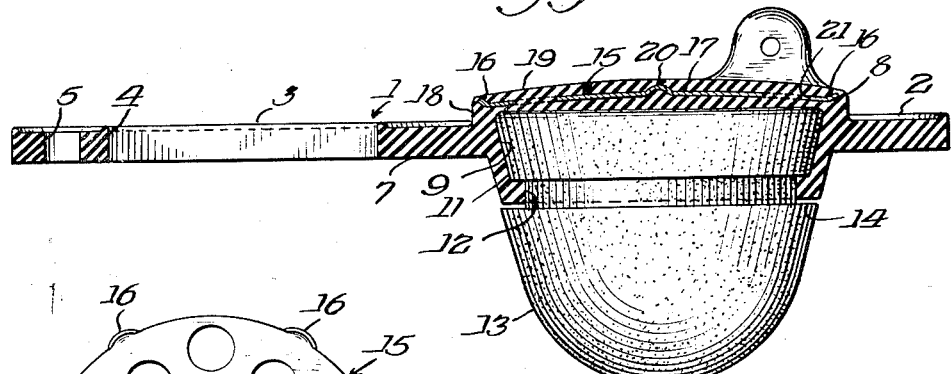
Fig. 2 is a section along line 2—2 of Fig. 1.
Figure 3:
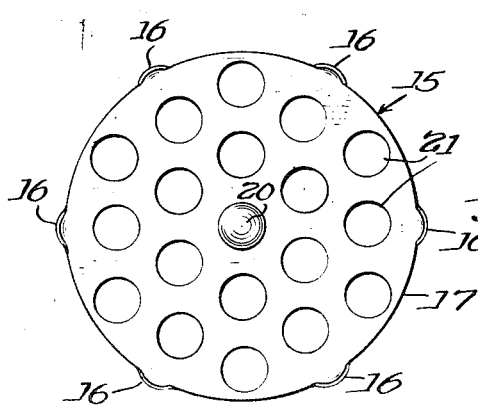
Fig. 3 is a top plan view of the insert member employed therein.

Referring more particularly to Figs. 1 through 3, reference numeral 1 generally designates what is commonly known and referred to as a flapper valve for use in discharging water closet flush tanks or the like. Such a tank, which is not shown in the drawing, is provided with a ported outlet portion which may be either integral with the ceramic tank for instance or provided on a separate outlet fitting of a common variety. In this connection attention is invited to application Serial No. 397,456, filed December 10, 1953.

Extending from the closure portion 2 of the valve member are spaced, resilient arms 3, the rearward ends of which are connected by the cross piece 4 apertured at 5 for reception of a button head mounting post formation for convenient attachment of the flapper member to the tank for swinging movement of the closure into the open and closed positions. Regarding the mounting details in which the mounting may be made on a projecting member or portion rising directly from the floor of the tank or on an extending portion from a common type of outlet fitting to which an overflow tube is attached, see the above noted application.

The closure portion of the valve member comprises an outer peripheral portion 7 for flat seating engagement with the top of the ported outlet portion of the flush tank and an inner portion 8 forming a downwardly opening cavity or pocket 9. This cavity more particularly is formed by an upwardly raised portion also designated by numeral 8 and a downwardly projecting annular skirt 11, the latter preferably terminating in an inturned lip 12. A float element 13 preferably of sealed cellular, fluid impervious construction such as of foam polystyrene or foam polyethylene is received within the cavity 9, said float element conforming to the inside tapered configuration of the cavity and substantially filling the same. This float element also is grooved at 14 for reception therewithin of the lip portion 12.

Received within the central raised portion 8 of the closure member is the reinforcement means 15 of the present invention. The latter means in its preferred form comprises a relatively thin, slightly dished member extending substantially throughout the raised portion of the closure member. The insert member, however, provides for certain spacing between the projections or means 16 extending beyond the periphery of the insert member and the outer limits of the raised portion. These projections are further upturned or raised so as to cooperate with the mold part in which the raised portion of the closure member is formed to space the principal or major portion 17 of the insert member away from the cylindrical surface 18 and also the upper domed surface 19 forming together the outer surface of the raised central portion. These projecting portions 16 therefore served the important and dual function of spacing the principal part of the insert member away from the outer surface of the closure member of the raised portion both transversely and vertically and providing means for centering the insert member within the raised portion.

The reinforcement member 15 is also provided with a central raised portion 20 which provides means for spacing the central part of the relatively thin insert member from the upper domed surface 19. Although not employed in the construction as shown in Figs. 1 to 3 inclusive, this center projection may be increased in height somewhat to provide additional centering of the insert member in cooperation with the outer peripheral portions 16 by being received within a depression or indentation in the mold part used for forming the outer surface of the raised portion 8 of the closure member. Preferably the closure member is molded in an upside down position, the insert member being conveniently dropped within the recess forming the outer surface of the raised portion of the closure. After such depositing of the insert member an upper mold part is then placed over the first part and rubber is caused to flow into the cavity thus formed for the formation of the closure member. In this connection it should be noted that the insert member is perforated throughout its extent by openings 21 through which the rubber is allowed to flow for engulfment of the insert member. In such inverted position the central projection 20 may be, as suggested, received in a depression in the bottom mold part for the centering of the insert member. As the rubber flows through the perforation and fills up the space between the insert member and part of the mold forming the upper domed surface, the flow causes the insert member to flex or move slightly downwardly for removal of the central projection from the depression in the mold part, forming the spaced arrangement of the insert piece from the upper surface of the raised portion substantially as shown in drawing Fig. 2. In this type of modified construction the peripheral projections supplement the central projection in centering or transversely positioning the insert member inasmuch as a certain amount of space is preferably provided between the outer ends of the projections 16 and the actual surface 18 of the raised portion.

However, the central projection 20 need not necessarily be of such proportions to be received within a depression in the mold part but the peripheral projections 16 will be sufficient to provide fairly accurate centering or transverse positioning of the insert member away from the surface 18 and also in properly centered position with respect to the outlet port over which the closure member is intended to lie. It should further be noted that the center portion 20 of the Figs. 1 to 3 form is rounded and that the peripheral projections 16 are likewise rounded. Experiment has shown that this form of the projections has a marked effect on the quality of valve member being produced. It has been found for example that such rounding of these projections provides for a smooth flow of rubber or similar moldable material over the surfaces of these projections for complete imbedment of the projections of the insert member within the central raised portion of the valve member. When non-rounded forms of peripheral projections particularly, are employed, it is found that sharp corners commonly protrude beyond the surfaces providing a product objectionable in appearance as well as providing the danger of scratches and cuts to the person handling the item. Such construction also provides for possible deterioration by introduction or seepage of water between the insert member and the rubber in which it is imbedded tending to cause separation of the upper and lower portions.

It should be understood of course that the closure member may be molded in an upright position with means in the lower mold part, retaining the insert member in fully raised position between the mold parts for proper imbedment of the insert member.

Figs. 4 and 5 show a slightly modified form of insert member in which the central projection 20 is open for the flow of rubber or other moldable material therethrough. This member is also perforated generally like the insert member of the last form and is provided with portions 16 serving the same function as the similar portions of the last described form, being likewise extended beyond the periphery of the insert member and also being raised in a generally similar fashion. The principal difference, however, besides the open central portion lies in the manner of forming the peripheral portions. In this form these portions are expanded or forced outwardly from a circular periphery by means of expanding die elements piercing the member at 23 whereby to force the metal outwardly to form the projections. Inasmuch as the die employed is rounded along the outer side as indicated by the surface 24 of the apertures 23 these projections are also rounded similarly to those of Figs. 1 through 3 form.

Figs. 6 and 7 show a further modification in which the central portion is open at 26 and the lateral as well as vertical spacing is accomplished by portions 16 extending beyond the outer periphery of the insert member and the element 27 extending vertically therefrom. In their formation these elements are struck out from the main body of the reinforcement piece, the forward or vertical extending portion 27 projecting through the rubber portion of the closure member and being provided with an aperture 28 for attachment to a chain or cord for raising the closure member from the valve seat in operation. The projections 16 are also raised as is the forward projection 27 previously noted, and further extend outwardly beyond the periphery and serve the same function as noted in connection with projections 16 of the earlier forms disclosed. These projections 16 are also rounded at the ends for smooth flow rubber or other material therearound for more perfect imbedment of the insert member.

Although the above forms do not cover all the arrangements which the present invention may be capable of assuming, they do point out the underlying idea of the invention which is to produce reinforcement means which can be accurately retained in a predetermined position within the central or non-valve seating contacting portion of the closure member during the molding process, and to produce an economical arrangement in which the insert member is completely imbedded and firmly fastened to the rubber or other material by means of perforations and projecting portions.

The invention should accordingly be limited only by the terms of the appended claims read in the light of the broad spirit of the invention.

We claim:

1. In a valve member having a closure portion constructed of flexible, yieldable, moldable material, said closure portion comprising a peripheral seat contacting portion and a central portion closing and sealing the center of the seat contacting portion, reinforcement means within the central portion for stiffening thereof, said reinforcement means comprising an insert piece molded within the central portion, said insert piece having means cooperating with the mold in which said closure portion is molded for predeterminately positioning said insert piece within said central portion of the valve closure during the molding process.

2. In a valve member having a closure portion constructed of flexible, yieldable, moldable material, said closure portion comprising a peripheral seat contacting portion and a central portion closing and sealing the center of the seat contacting portion, reinforcement means within the central portion for stiffening thereof, said reinforcement means comprising an insert piece molded within the central portion, said insert piece having projecting portions spacing the major portion of said insert piece from at least one surface of the central portion and retaining said insert piece in substantially centered position within the central portion during the molding operation in cooperation with the mold in which said closure portion is molded.

3. The subject matter of claim 2, said insert piece comprising a perforated member from which the projecting portions extend.

4. The subject matter of claim 1, said central portion of the valve member comprising raised means, said insert piece having projecting portions spacing the major portion of said insert piece from at least one surface of the central portion and retaining said insert piece in substantially centered position within the central portion during the molding operation in cooperation with the mold in which said closure portion is molded, at least some of said projecting portions extending within the aforesaid raised means.

5. The structure defined in claim 2 in which at least one of said projecting portions of the insert piece is positioned at a central portion of the insert piece and other projecting portions are outwardly spaced therefrom.

6. In a valve member having a closure portion constructed of flexible, yieldable, moldable material, said closure portion, comprising a peripheral seat contacting portion and a central portion closing and sealing the center of the seat contacting portion, reinforcement means within the central portion for effecting the stiffening thereof, said reinforcement means comprising an insert piece molded within the central portion extending substantially throughout the entire portion, said central portion of the valve member comprising raised means, said insert piece having projecting portions spacing the major portion of said itsert piece from one surface of the central portion and retaining said insert piece in substantially centered position within the central portion during the moldng operation in cooperation with the mold in which said closure portion is molded, said projecting portions of the insert piece comprising raised portions extending outwardly beyond the periphery thereof, said raised portions being rounded at least at the ends and extending within the aforesaid raised means of the closure portion.

7. In a valve member having a closure portion constructed of flexible, yieldable, moldable material, said closure portion comprising a seat contacting portion projecting outwardly from a raised central portion, reinforcement means within the raised central portion for effecting the stiffening thereof, said reinforcement means comprising an insert piece molded within the raised portion, said insert piece having spaced portions retaining the major portion of said insert piece in spaced relation from the surface of the raised side of the raised portion in cooperation with the mold in which said closure portion is molded.

8. In a valve member having a closure portion constructed of flexible, yieldable, moldable material, said closure portion comprising a seat contacting portion projecting outwardly from a raised central portion, reinforcement means within the raised central portion for stiffening thereof, said reinforcement means comprising an insert piece molded within the raised portion, said insert piece being provided with a raised portion at least near the center of the insert piece and raised portions extending outwardly beyond the periphery of the insert piece spacing the major portion of said insert piece from the raised side of the raised portion of the closure member and retaining the said piece in substantially centered position therewithin during the molding operation in cooperation with the mold in which said closure portion is molded.

9. The subject matter of claim 8, said insert piece being a relatively thin perforated member, said raised portions extending outwardly beyond the periphery being rounded at least near the ends.

No references cited.